(12) United States Patent
Okita et al.

(10) Patent No.: US 12,545,195 B2
(45) Date of Patent: Feb. 10, 2026

(54) ASSEMBLED BODY

(71) Applicants: TOYOTA JIDOSHA KABUSHIKI KAISHA, Toyota (JP); DENSO TEN Limited, Hyogo (JP)

(72) Inventors: Munechika Okita, Nisshin (JP); Ryohsuke Yamamoto, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 206 days.

(21) Appl. No.: 18/408,839

(22) Filed: Jan. 10, 2024

(65) Prior Publication Data
US 2024/0308442 A1    Sep. 19, 2024

(30) Foreign Application Priority Data
Mar. 13, 2023 (JP) ................. 2023-039080

(51) Int. Cl.
*B60R 13/08* (2006.01)
*G10K 11/178* (2006.01)

(52) U.S. Cl.
CPC .... *B60R 13/0884* (2013.01); *G10K 11/17821* (2018.01); *B60Y 2306/09* (2013.01)

(58) Field of Classification Search
CPC .......... B60R 13/0884; G10K 11/17821; B60Y 2306/09
USPC .......................................... 381/71.4
See application file for complete search history.

(56) References Cited

U.S. PATENT DOCUMENTS

| | | | |
|---|---|---|---|
| 5,883,961 A * | 3/1999 | House ................ | H04S 7/307 381/26 |
| 2002/0126852 A1* | 9/2002 | Kashani .......... | G10K 11/17879 381/94.1 |
| 2019/0359130 A1 | 11/2019 | Fujii et al. | |

FOREIGN PATENT DOCUMENTS

JP    2019-202653 A    11/2019

* cited by examiner

*Primary Examiner* — Vivian C Chin
*Assistant Examiner* — Douglas J Suthers
(74) *Attorney, Agent, or Firm* — Oliff PLC

(57) ABSTRACT

An assembled body includes: a back door of a vehicle, the back door including an internal space; a subwoofer attached to the back door, a front face of the subwoofer being oriented to the outside of the back door, a back face of the subwoofer being oriented to an internal space side of the back door; and an exciter attached to the back door, the exciter generating an output for cancelling vibration of an installation spot due to the subwoofer.

4 Claims, 2 Drawing Sheets

ASSEMBLED BODY

CROSS-REFERENCE TO RELATED APPLICATION

This application claims priority to Japanese Patent Application No. 2023-039080 filed on Mar. 13, 2023, incorporated herein by reference in its entirety.

BACKGROUND

1. Technical Field

The present disclosure relates to an assembled body.

2. Description of Related Art

Conventionally, a technology for providing a speaker on a back door of a vehicle has been disclosed as described in Japanese Unexamined Patent Application Publication No. 2019-202653. As a technology for reproducing low-pitched sound, it is possible to equip a subwoofer on the back door.

SUMMARY

Due to the operation of the subwoofer, the back door sometimes vibrates. Due to the vibration, the sound pressure or sound quality of audio output sometimes decreases. Further, due to the vibration, a chattering sound, which is unpleasant for a passenger, is sometimes generated.

An object of the present disclosure made in view of the circumstance is to provide an assembled body in which the vibration of the back door due to the operation of the subwoofer is reduced.

An assembled body according to an embodiment of the present disclosure includes:
- a back door of a vehicle, the back door including an internal space;
- a subwoofer attached to the back door, a front face of the subwoofer being oriented to the outside of the back door, a back face of the subwoofer being oriented to an internal space side of the back door; and
- an exciter attached to the back door, the exciter generating an output for cancelling vibration of an installation spot due to the subwoofer.

With the assembled body according to an embodiment of the present disclosure, it is possible to reduce the vibration of the back door due to the operation of the subwoofer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline of Embodiment

Figure 1:
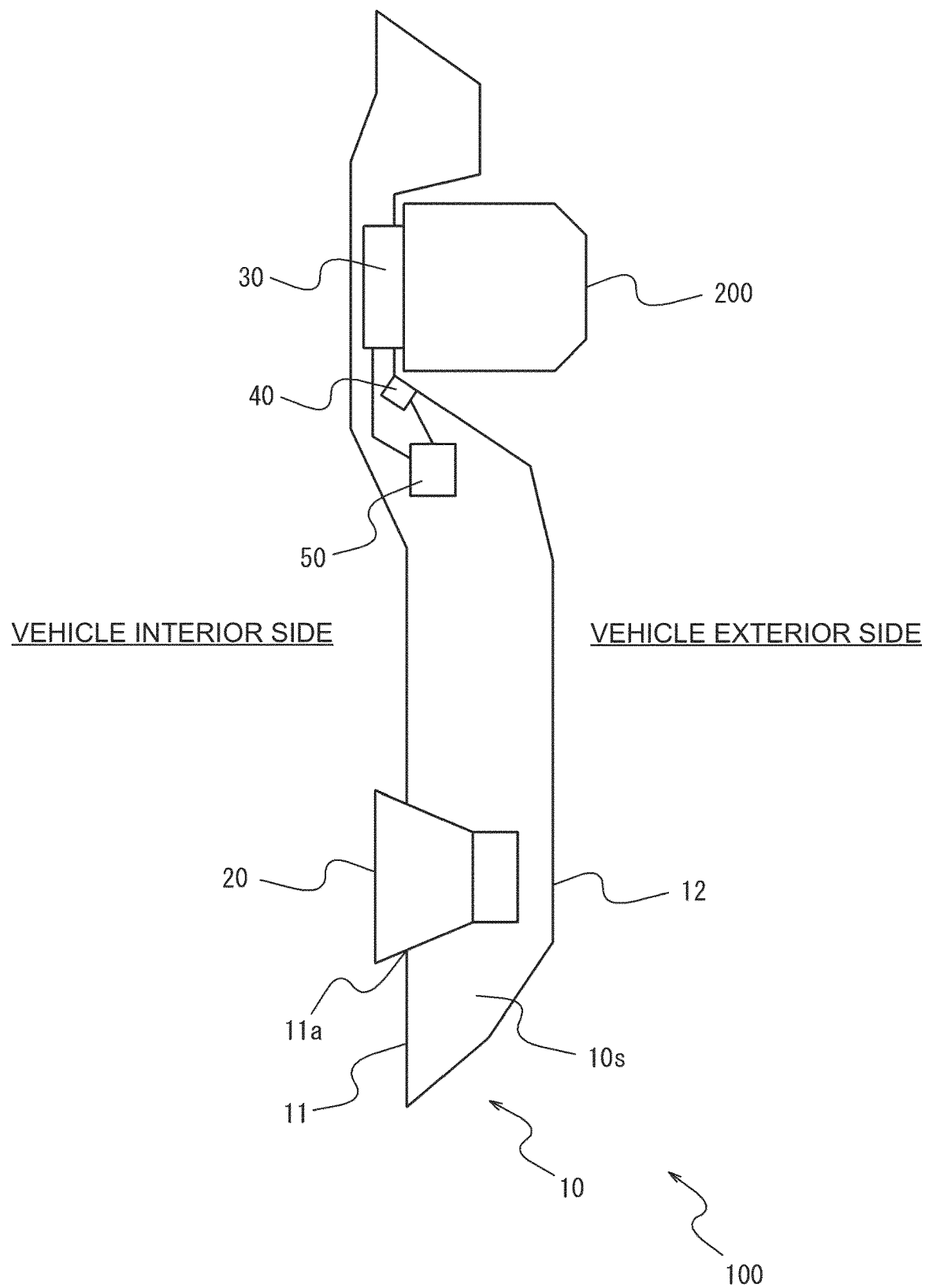
FIG. 1 is a horizontal sectional view showing a schematic configuration of an assembled body according to an embodiment of the present disclosure.
Figure 2:
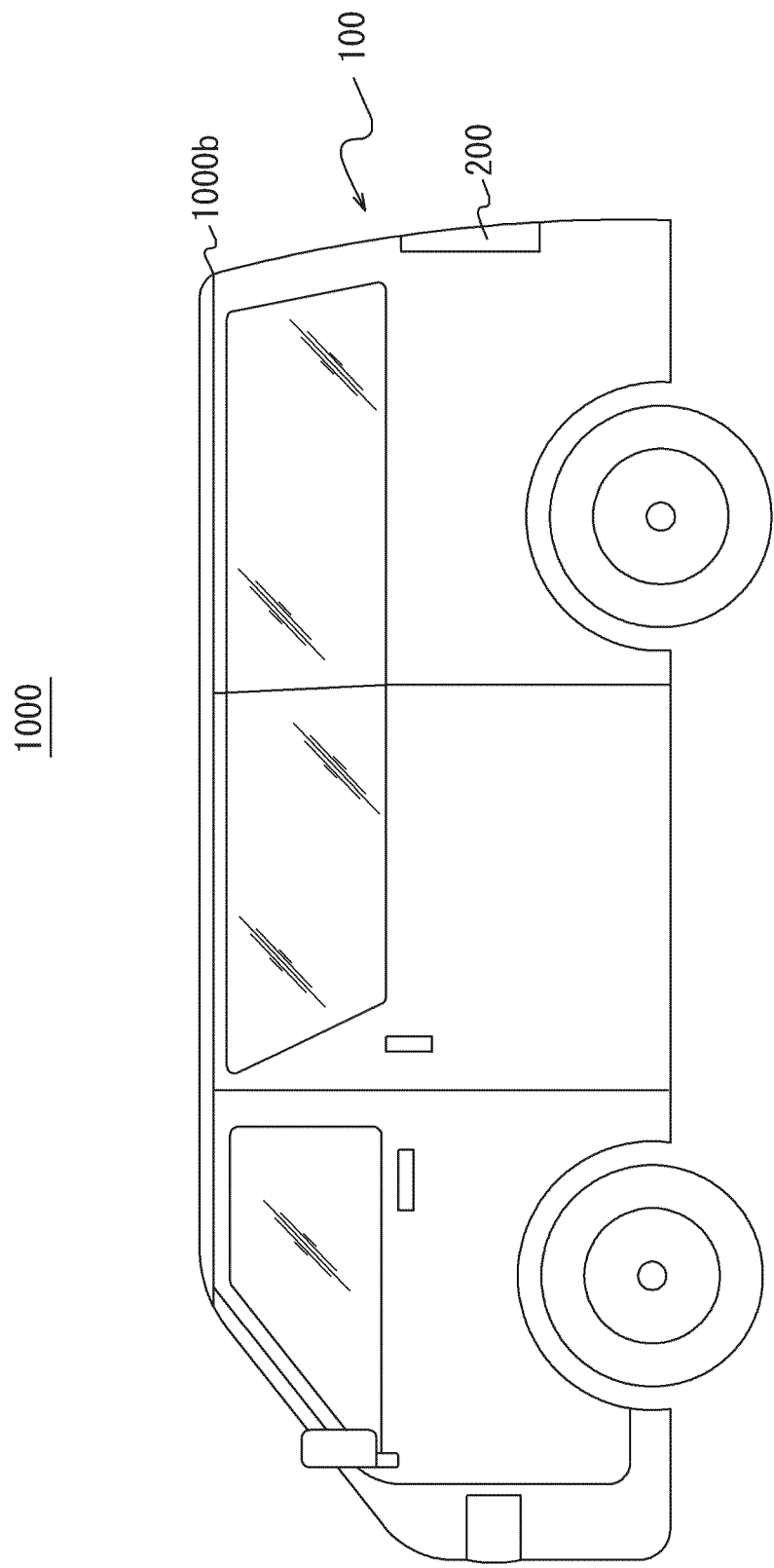
FIG. 2 is a diagram showing a vehicle including an assembled body according to the embodiment of the present disclosure.

With reference to FIG. 1, an outline of an assembled body 100 according to an embodiment of the present disclosure will be described. With reference to FIG. 2, the assembled body 100 is included on the rear side of a vehicle 1000, for example.

The vehicle 1000 is an automobile, for example, but may be an arbitrary vehicle without being limited to the automobile. The automobile is a gasoline vehicle, a diesel vehicle, a battery electric vehicle (BEV), a hybrid electric vehicle (HEV), a plug-in hybrid electric vehicle (PHEV), a fuel cell electric vehicle (FCEV), or the like, for example, but is not limited to them.

The vehicle 1000 may include a member 200 capable of vibrating due to the operation of a subwoofer 20 described later. The member 200 may be a tail lamp, a number plate, an electronic control unit (ECU), or the like.

First, the outline of the embodiment will be described. Details of the embodiment will be described later. With reference to FIG. 1, the assembled body 100 includes a back door 10 including an internal space 10s. The assembled body 100 further includes a subwoofer 20. The subwoofer 20 is attached to the back door 10, such that the front face is oriented to the outside (vehicle interior side) of the back door 10 and the back face is oriented to the internal space 10s side (vehicle exterior side) of the back door 10. The assembled body 100 further includes an exciter 30 attached to the back door 10. The exciter 30 generates an output for cancelling the vibration of an installation spot due to the subwoofer 20.

In the embodiment, the exciter 30 attached to the back door 10 generates the output for cancelling the vibration of the installation spot due to the subwoofer 20. Therefore, the vibration of the back door 10 due to the operation of the subwoofer 20 is reduced.

Configuration of Member Capable of Vibrating Due to Operation of Subwoofer

The vibration of the back door 10 due to the operation of the subwoofer 20 is sometimes amplified at the member 200 included in the vehicle 1000, in a natural vibration mode. Due to the amplified vibration, the member 200 sometimes generates a chattering sound. Examples of the member 200 include an ECU disposed in the internal space 10s or the like of the back door 10, a tail lamp and a number plate attached to the vehicle exterior side of the back door 10, and a wiper put on a back door glass.

Configuration of Assembled Body

The assembled body 100 includes the back door 10, the subwoofer 20, and the exciter 30. The assembled body 100 may include a sensor 40 and a control unit 50.

The back door 10 may be a flip-up door. More specifically, the back door 10 may be opened and closed by pivoting around a rear-side upper edge 1000b (see FIG. 2) of the vehicle 1000. By the opening of the back door 10, the rear side of the vehicle 1000 is opened.

The back door 10 includes an inner panel 11 and an outer panel 12.

The inner panel 11 is disposed on the vehicle interior side of the vehicle 1000. An interior panel is attached to a surface on the vehicle cabin side of the inner panel 11. An opening portion 11a for exposing a speaker of the later-described subwoofer 20 to the vehicle interior side may be formed on the inner panel 11 and interior panel. The inner panel 11 may be formed of a steel plate, a resin plate, or the like.

The outer panel 12 is disposed on the vehicle exterior side of the vehicle 1000. Both width-directional end portions of the outer panel 12 may be bent so as to be oriented to the vehicle interior side. The outer panel 12 may be dented to the vehicle interior side at the vicinity of the member 200. The outer panel 12 may be formed of a steel plate, a resin plate, or the like.

The inner panel 11 and the outer panel 12 demarcate the internal space 10s. The inner panel 11 and the outer panel 12 may be joined by an adhesive, by welding, or the like.

An opening portion may exist between the inner panel 11 and the outer panel 12. In the case where the opening portion exists, the "internal space" in the embodiment communicates with a space in the vehicle cabin through the opening portion. The internal space 10s may be disposed at a lower portion of the back door 10.

The back door glass may be fit in an upper portion of the back door 10.

The subwoofer 20 reproduces low-pitched sound having a lower band than the sound from a main speaker. The subwoofer 20 is attached to the back door 10, such that the front face is oriented to the outside (vehicle interior side) of the back door 10 and the back face is oriented to the internal space 10s side (vehicle exterior side) of the back door 10. For example, the subwoofer 20 may be attached to the vehicle exterior side of the inner panel 11.

The exciter 30 generates the output for cancelling the vibration due to the subwoofer 20. More specifically, a coil included in the exciter 30 may vibrate when electric current flows through the exciter 30.

The exciter 30 may be attached to the back door 10. A plurality of exciters 30 may be provided. The exciter 30 is provided so as to correspond to the member 200 capable of vibrating due to the operation of the subwoofer 20. The number of members 200 and the number of exciters 30 may be the same.

Specifically, the exciter 30 may be provided between the back door 10 and the member 200. When the exciter 30 is attached between the back door 10 and the member 200, the exciter 30 can cancel the vibration generated by the subwoofer 20, before the vibration reaches the member 200. Alternatively, it is possible to reduce the vibration that is generated by the subwoofer 20 and that reaches the member 200.

The sensor 40 may detect the vibration of the member 200. The sensor 40 may be an acceleration sensor. The sensor 40 may measure the magnitude and frequency of the vibration. The sensor 40 may be provided at the vicinity of the member 200. The sensor 40 may be provided on the internal space 10s side of the outer panel 12. The sensor 40 may be attached to a trim in the vehicle 1000. The sensor 40 may operate only at the time of the operation of the subwoofer 20.

The control unit 50 includes one or more processors, one or more programmable circuits, one or more dedicated circuits, or combinations of them. The processor is a general-purpose processor such as a central processing unit (CPU) or a graphics processing unit (GPU), or a dedicated processor for a specified process, for example, but is not limited to them. The programmable circuit is a field-programmable gate array (FPGA), for example, but is not limited to this. The dedicated circuit is an application 10 specific integrated circuit (ASIC), for example, but is not limited to this. The control unit 50 may be connected to the exciter 30 and the center 40 by wire or by wireless. The control unit 50 may be provided in the internal space 10s of the back door 10.

The control unit 50 may decide the output of the exciter 30.

The control unit 50 may execute a feedforward control to decide the output of the exciter 30 based on the output of the subwoofer 20. More specifically, the control unit 50 may increase the vibration that is generated by the exciter 30, as the sound volume of the subwoofer 20 is larger. For realizing the control, the control unit 50 may be connected to the subwoofer 20 by wire or by wireless. When the control unit 50 decides the output of the exciter 30 based on the output of the subwoofer 20, it is possible to more quickly cancel the vibration of the back door 10 due to the subwoofer 20. Further, the output may be decided based on the result of a test that is performed for the back door 10, the vehicle 1000, or the like in advance. Thereby, the control unit 50 can be simplified.

Alternatively, the control unit 50 may execute a feedback control to decide the output of the exciter 30 based on the detection value of the sensor (acceleration sensor) 40. By this configuration, the control unit 50 can effectively cancel the vibration of the back door 10. The control unit 50 may execute the feedback control such that the detection value of the sensor 40 is zero or within an acceptable range. The acceptable range may be decided based on a bench test for the member 200 and the like. The sensor 40 may be provided at the vicinity of the member 200. By this configuration, it is possible to more effectively cancel 30 the vibration of the back door 10.

As described above, the assembled body 100 according to the embodiment includes the back door 10 including the internal space 10s. The assembled body 100 further includes the subwoofer 20 that is attached to the back door 10 such that the front face is oriented to the outside (vehicle interior side) of the back door 10 and the back face is oriented to the internal space 10s side (vehicle exterior side) of the back door 10. The assembled body 100 further includes the exciter 30 that is attached to the back door 10 and that generates the output for cancelling the vibration of the installation spot due to the subwoofer 20.

In this configuration, the exciter 30 attached to the back door 10 generates the output for cancelling the vibration of the installation spot due to the subwoofer 20. Therefore, the vibration of the back door 10 due to the operation of the subwoofer 20 is reduced.

The present disclosure has been described based on the drawings and the embodiment. Note that a person skilled in the art may perform various modifications and alterations based on the present disclosure. Accordingly, note that the modifications and alterations are included in the scope of the present disclosure. For example, functions and others included in constituent portions, steps or the like can be rearranged such that there is no logical inconsistency, and a plurality of constituent portions, steps or the like can be combined to one, or can be divided.

For example, in the above-described embodiment, it is allowable to adopt an embodiment in which the configuration and operation of the control unit 50 are distributed to a plurality of computers that can communicate with each other. Further, for example, it is allowable to adopt an embodiment in which some or all of the constituent elements of the control unit 50 are provided in the vehicle 1000.

What is claimed is:

1. An assembled body comprising:
   a back door of a vehicle, the back door including an internal space;
   a subwoofer attached to the back door, a front face of the subwoofer being oriented to an outside of the back door, a back face of the subwoofer being oriented to an internal space side of the back door; and
   an exciter attached to the back door, the exciter generating an output for cancelling vibration of an installation spot due to the subwoofer, wherein the output of the exciter is decided based on an output of the subwoofer.

2. The assembled body according to claim 1, wherein the exciter is provided between the back door and a member capable of vibrating due to operation of the subwoofer.

3. The assembled body according to claim 2, wherein the member capable of vibrating is a tail lamp, a number plate, or an electronic control unit ECU).

4. The assembled body according to claim 2, wherein a sensor that detects the vibration of the member is provided, and the output of the exciter is decided based on a measurement result of the sensor.

\* \* \* \* \*